United States Patent [19]

Carey

[11] 4,167,645
[45] Sep. 11, 1979

[54] ELECTRICAL CURRENT-CARRYING FLUID HOSE CONSTRUCTION

[75] Inventor: Richard D. Carey, Waynesville, N.C.

[73] Assignee: Dayco Corporation, Dayton, Ohio

[21] Appl. No.: 851,090

[22] Filed: Nov. 14, 1977

[51] Int. Cl.² .................... F16L 11/12; A47L 9/24
[52] U.S. Cl. .................... 174/47; 138/122; 138/129; 138/154; 156/195; 428/57; 428/157; 428/192
[58] Field of Search ............... 174/47; 138/103, 121, 138/122, 129–136, 150, 154; 156/143, 144, 195, 244.13, 244.15; 428/33, 57, 58, 60, 157, 192

[56] References Cited

U.S. PATENT DOCUMENTS

| | | | |
|---|---|---|---|
| 1,068,553 | 7/1913 | Abell et al. | 138/135 |
| 2,288,094 | 6/1942 | Karmazin | 138/154 X |
| 2,524,522 | 10/1950 | Gilmore et al. | 174/47 X |
| 2,707,492 | 5/1955 | Harris et al. | 138/122 |
| 2,739,089 | 3/1956 | Hageltorn | 138/129 X |
| 3,199,541 | 8/1965 | Richitelli | 138/129 |
| 3,273,600 | 9/1966 | Swan | 138/122 |
| 3,679,531 | 7/1972 | Wienand et al. | 174/47 X |
| 3,919,026 | 11/1975 | Mizutani et al. | 156/143 |

FOREIGN PATENT DOCUMENTS 2439966  3/1975  Fed. Rep. of Germany ............. 174/47

Primary Examiner—Laramie E. Askin
Attorney, Agent, or Firm—Reuben Wolk

[57] ABSTRACT

An electric current-carrying fluid hose construction and method of making same are provided and such hose construction is comprised of at least one elongated polymeric strip having a central body of solid cross section which has at least one electrical conductor embedded therein and with the strip having first and second projections extending from opposite side portions of the central body as a single-piece construction, and the strip is wound in a helical pattern with its projections connected to define the hose construction with the central body having at least one outwardly convex arcuate surface comprising the outwardly convoluted configuration and having a substantially flat surface which comprises the substantially smooth inside surface.

15 Claims, 9 Drawing Figures

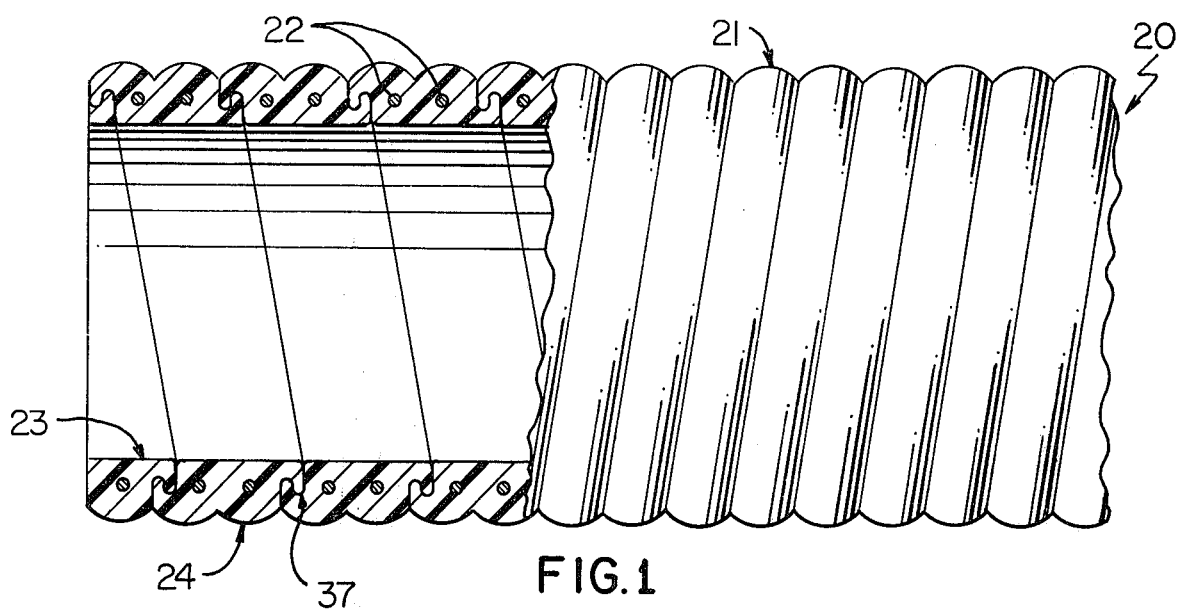
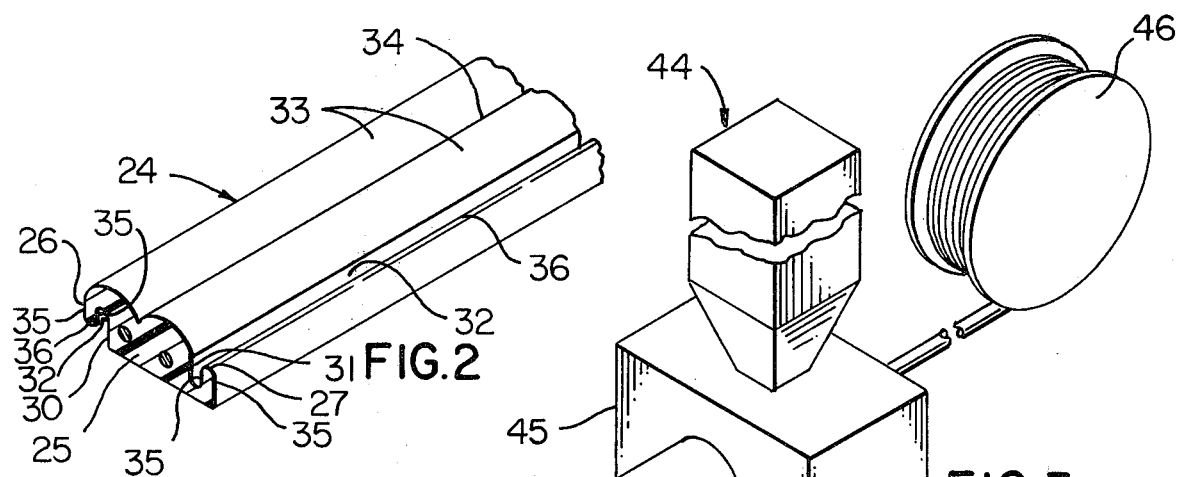
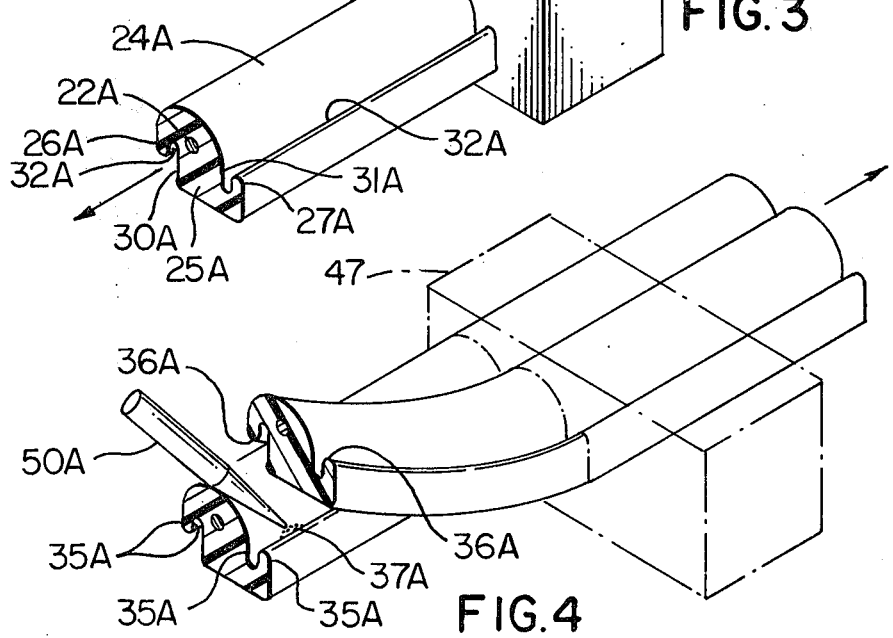

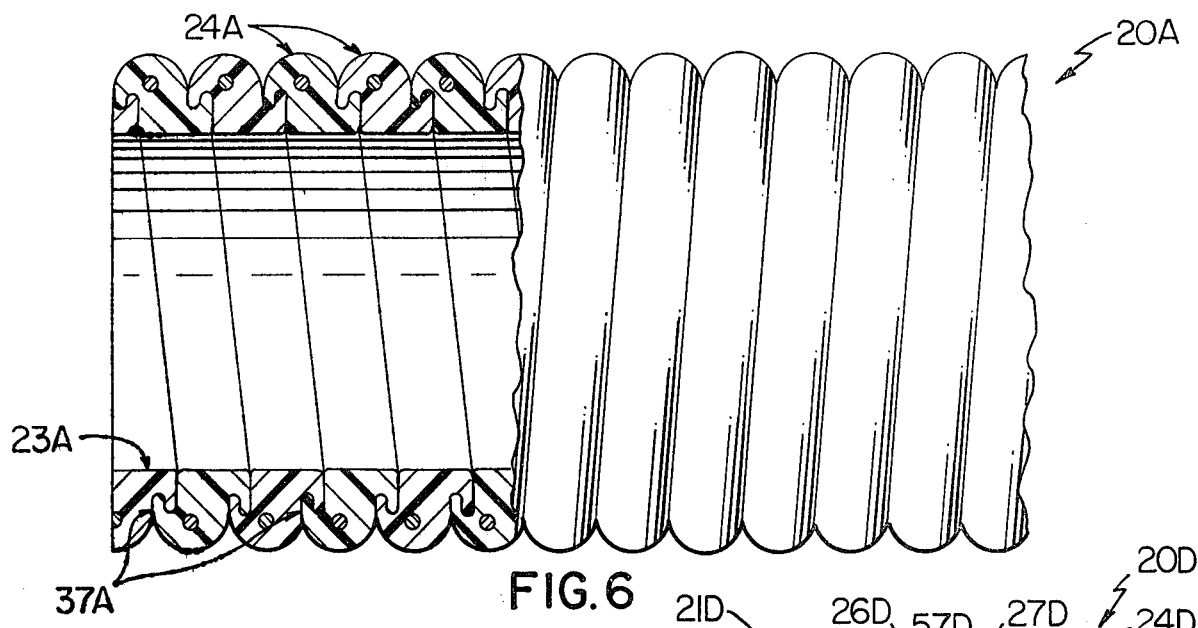
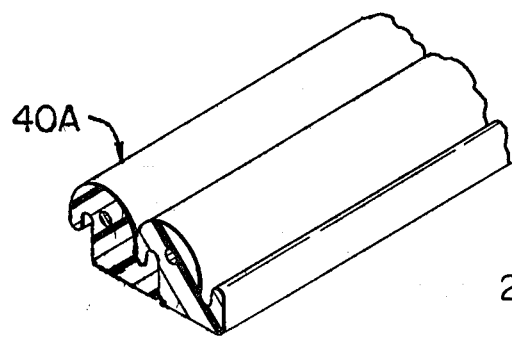
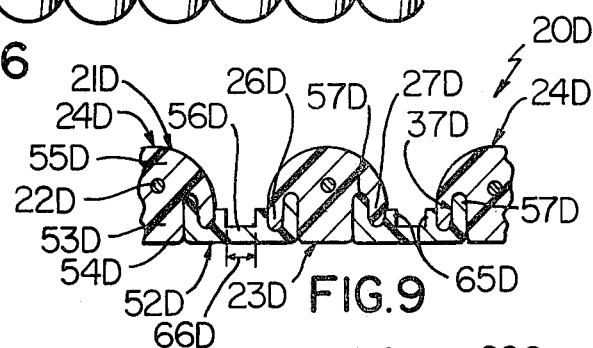
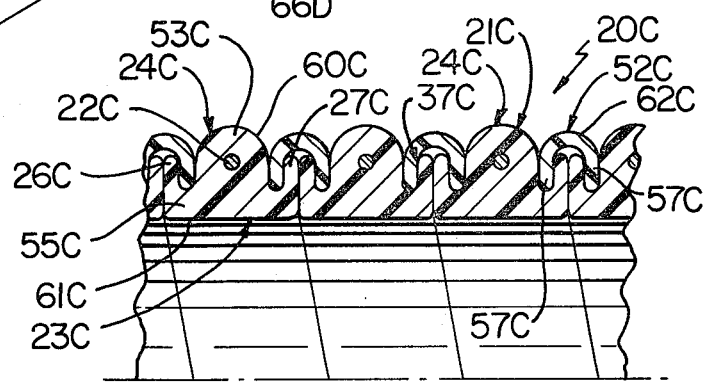
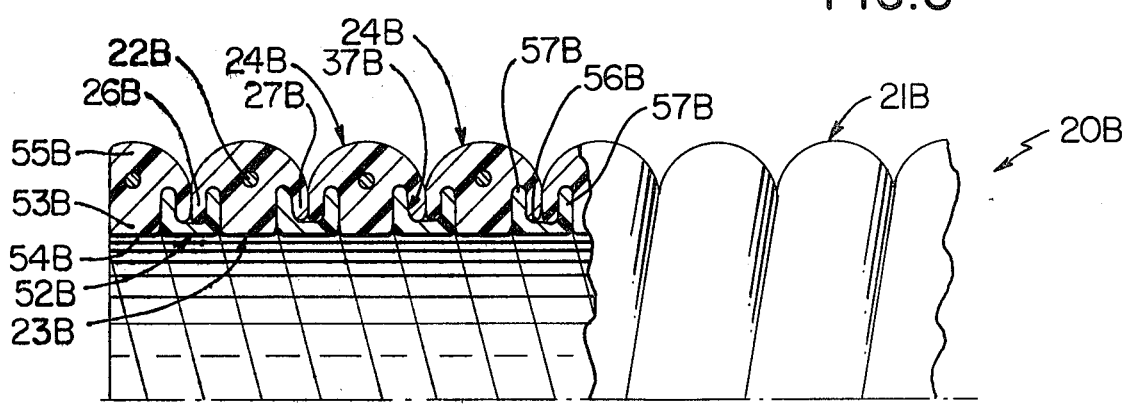

ELECTRICAL CURRENT-CARRYING FLUID HOSE CONSTRUCTION

BACKGROUND OF THE INVENTION

Electric current-carrying fluid hoses made by helically winding a polymeric strip and suitably fixing opposed side edges thereof to complete the hose construction have been proposed heretofore. However, such previously proposed hoses are deficient because many are too expensive, others do not provide the desired performance characteristics, and still others require expensive manufacturing methods or processes.

SUMMARY

It is a feature of this invention to provide a hose construction which basically overcomes the above-mentioned deficiencies.

Another feature of this invention is to provide an electric current-carrying hose construction of the character mentioned made of at least one helically wound elongated strip having integral electrical conductor means embedded therein.

Another feature of this invention is to provide a hose construction of the character mentioned wherein such elongated strip has hooking projections which are adapted to be interlocked to thus assure such hose construction may be easily manufactured yet with the completed hose construction having optimum structural strength.

Another feature of this invention is to provide a hose construction of the character mentioned wherein the electrical conductor means may be a single conductor or a plurality of conductors embedded in each strip.

Another feature of this invention is to provide a hose construction of the character mentioned defined by a plurality of interconnected helically wound polymeric strips.

Another feature of this invention is to provide a hose construction of the character mentioned having an outwardly convoluted configuration.

Another feature of this invention is to provide a hose construction of the character mentioned having a substantially smooth inside surface which lends itself to fluid flow therethrough with minimum turbulence.

Another feature of this invention is to provide a hose construction of the character mentioned having an outwardly convoluted configuration with a substantially smooth inside surface and optimum flexibility.

Another feature of this invention is to provide a hose construction of the character mentioned which employs a plurality of elongated polymeric strips each having at least one electrical conductor embedded therein and wherein the strips may be helically wound together independently or employing an interconnecting strip of U-shaped cross section to define the hose construction.

Another feature of this invention is to provide an improved method of making a hose construction of the character mentioned.

Accordingly, it is an object of this invention to provide a hose construction of the character mentioned and method of making same having one or more of the novel features set forth above or hereinafter shown or described.

Other details, features, objects, uses, and advantages of this invention will become apparent from the embodiments thereof presented in the following specification, claims, and drawings.

BRIEF DESCRIPTION OF THE DRAWINGS

The accompanying drawings show present preferred embodiments of this invention, in which FIG. 1 is a view with parts in elevation, parts in cross section, and parts broken away illustrating one exemplary embodiment of the hose construction of this invention made from single helically wound polymeric strip;

FIG. 2 is a perspective view of a straight length of the strip used to make the hose construction of FIG. 1 with the forward portion thereof in cross section and the rear portion broken away;

FIG. 3 is a perspective view with parts in cross section, parts in elevation, and parts broken away illustrating one method which may be employed in making another embodiment of an elongated polymeric strip having an integral electrical conductor embedded therein and with such strip being employed to make another embodiment of the hose construction of this invention;

FIG. 4 is a perspective view with parts shown schematically particularly illustrating the manner in which a pair of strips as defined in FIG. 3 are passed through a forming head to interlock such strips and define a strip assembly which is then helically wound to define the hose construction of FIG. 1;

FIG. 5 is a perspective view of a straight length of the strip assembly of FIG. 4 with the forward portion thereof in cross section and the rear portion broken away;

FIG. 6 is a view similar to FIG. 1 illustrating another exemplary embodiment of the hose construction of this invention made using the elongated polymeric strip assembly of FIG. 5;

FIG. 7 is a view similar to the top half portion of FIG. 6 illustrating another exemplary embodiment of the hose construction of this invention;

FIG. 8 is a view similar to the top left hand portion of FIG. 7 illustrating another exemplary embodiment of the hose construction of this invention; and FIG. 9 is a view similar to the top left hand portion of FIG. 7 illustrating another exemplary embodiment of the hose construction of this invention.

DETAILED DESCRIPTION

Reference is now made to FIG. 1 of the drawings which illustrates one exemplary embodiment of the fluid hose construction of this invention which is designated generally by the reference numeral 20. The hose construction 20 has an outwardly convoluted configuration 21, integral electrical conductor means shown as a pair of electrical conductors 22 extending in a helical pattern therealong, and a substantially smooth inside surface 23. The hose construction 20 is of simple and economical construction yet has optimum structural integrity. In addition, an embodiment of the hose construction has all of the above mentioned advantages plus improved flexibility.

The hose construction 20 is comprised of elongated polymeric strip means which in this example is in the form of at least one elongated polymeric strip which is designated by the general reference numeral 24, FIG. 2. The strip 24 has a central body 25 of solid cross section and has first and second hooking projections 26 and 27 respectively extending from opposite side portions of such central body with the projections 26 and 27 and the central body 25 being defined as a single-piece construction. The hooking projections 26–27 are disposed in parallel relation and parallel to the central body and in particular to opposed parallel side edges 30 and 31 of such central body 25 and each hooking projection 26 and 27 defines a recess which will be designated by the same reference numeral 32 between it and the central body 25.

The strip 24 is wound in a helical pattern with the first hooking projection 26 interconnected to the second hooking projection 27 and as shown in FIG. 1 to define the hose construction 20. With the strip 24 wound in a helical pattern the electrical conductor means or electrical conductors 22 are also wound in a helical pattern and along the full length of the hose construction 20.

The outwardly convoluted configuration 21 of the hose construction 20 is defined by outwardly convex arcuate surface means of the central body. The outwardly convex surface means is defined by at least one semicylindrical surface on the central body 25 and in this example is defined by a pair of semicylindrical outside surfaces 33 interconnected on a common longitudinal edge 34. Accordingly, it will be seen that the manner in which the strip 24 is helically coiled defines a pair of side-by-side convolutions.

As best seen in FIG. 2 of the drawings each of the projections 26 and 27 is defined by a pair of parallel planar surfaces each designated by the same reference numeral 35 which are interconnected at their terminal outer edges by a semicylindrical surface 36. The strip 24 is suitably helically wound utilizing any suitable method and apparatus to thereby define the hose construction 20 and during the helical coiling or winding process it will be appreciated that projection 26 is received within recess 32 of projection 27. The projections 26 and 27 are interconnected or interlocked within their associated recesses 32 and suitable adhesive means 37 is disposed at the roughly Z-shaped adhesive interface between adjoining turns of the strip 24 so that the hose construction 20 has optimum structural integrity.

The adhesive interface 37 may be defined by heat sealing or fusion, by an adhesive coating or layer, or by a solvent which defines the Z-shaped interface.

Other exemplary embodiments of the hose construction of this invention are illustrated in FIGS. 6, 7, 8, and 9 of the drawings. The hose constructions illustrated in FIGS. 6, 7, 8, and 9 are very similar to the hose construction 20; therefore, such hose constructions will be designated by the reference numerals 20A, 20B, 20C, and 20D respectively and representative parts of each hose construction which are similar to corresponding parts of the hose construction 20 will be designated in the drawings by the same reference numeral as in the hose construction 20 (whether or not such representative parts are mentioned in the specification) followed by the letter designation A, B, C, or D and not described again in detail. Only those component parts of each hose construction which are substantially different from corresponding parts of the hose construction 20 will be designated by a new reference numeral also followed by an associated letter designation and described in detail.

The hose construction 20A of FIG. 6 is comprised of a plurality of two elongated polymeric strips each designated by the same numeral 24A which are suitably interconnected or interlocked to define a strip assembly 40A as shown in FIG. 5. The assembly 40A is suitably wound in a helical pattern to define the hose construction 20A having its outwardly convoluted configuration 21A, integral electrical conductors 22A, and a substantially smooth inside surface 23A.

Each strip 24A may be made in a continuous process utilizing a suitable polymeric material preferably in the form of a synthetic plastic material and as shown in FIG. 3. Each strip 24A is preferably made by extruding polymeric material using extrusion apparatus 44 of any suitable type known in the art through an extruder head 45 to define the polymeric strip 24A. During the process of extruding the strip 24A to define the configuration thereof, electrical conductor means in the form of an electrical wire 22A is introduced into the head 45 and such wire 22A is embedded in the strip 24A as an integral part thereof and the polymeric material defining the strip 24A forms a matrix for the wire 22A. The wire 22A is provided on a suitable supply roll 46 thereof and suitably supported for unwinding rotation as is known in the art. The operation of the overall extrusion apparatus is such that the polymeric strip 24A is continuously defined with the electrically conductive wire 22A embedded therein and as shown in FIG. 3.

The hose construction 20A of FIG. 6 is defined by helically winding strip assembly 40A consisting of a plurality of two strips 24A. The strip assembly 40A is formed by bonding the two strips 24A in a forming head 47 as shown in FIG. 4; and, as the pair of strips 24A are passed through such forming head 47, suitable adhesive means is introduced in the form of an adhesive 37A which is introduced using a suitable nozzle 50A which is operatively connected to an adhesive supply source (not shown).

As seen in FIG. 3 of the drawings the polymeric strip 24A has a central body 25A provided with opposed side surfaces 30A and 31A and projections 26A and 27A extending from such central body. Each projection 26A and 27A defines an associated recess 32A and each projection 26A and 27A has opposed parallel surfaces 35A connected at their terminal outer edges by a semicylindrical surface 36A. The strip assembly 40A defined by strips 24A is helically wound to define hose construction 20A and opposed side edges of the assembly 40A are bonded by Z-shaped adhesive means 37A, FIG. 6.

The hose construction 20B of FIG. 7 comprises a pair of identical polymeric strips 24B of T-shaped cross-sectional configuration and a U-shaped connector 52B connecting associated projections of the strips 24B. The strips 24B and U-shaped connector 52B are wound in a helical pattern and interconnected by U-shaped adhesive means 37B therebetween to define the hose construction 20B having a pair of integral electrical conductors 22B extending therealong.

The T-shaped cross-sectional configuration of each of the strips 24B is defined by a leg 53B having a flat bottom surface 54B and a transverse arm 55B having first 26B and second 27B projections defined as an integral portion thereof. The transverse arm 55B and projections of each strip comprise the outwardly convex arcuate surface 21B of the hose construction 20B; and, each of the T-shaped strips 24B is helically wound with its leg 53B disposed toward the center of the hose construction 20B and with its transverse arm 55B comprising the outwardly convoluted configuration 21B of such hose construction and with the bottom surface 54B of the vertical leg 53B comprising the inside surface 23B of the hose construction 20B.

The U-shaped connector 52B of the hose construction 20B has a rectilinear bight 56B adjoined at its opposite ends by a pair of parallel members 57B disposed perpendicular thereto. The bight 56B cooperates with the bottom surface to define the inside surface 23B.

The hose construction 20C of FIG. 8 comprises a pair of identical polymeric strips 24C also of T-shaped cross-sectional configuration and a U-shaped connector 52C connecting associated projections of the strips 24C. The strips 24C and U-shaped connector 52C are interconnected and bonded by roughly U-shaped adhesive means or layer 37C and wound in a helical pattern to define the hose construction 20C having a pair of integral electrical conductors 22C extending therealong.

The T-shaped cross-sectional configuration of each of the strips 24C is defined by a leg 53C having an arcuate bottom surface 60C and a transverse arm 55C having the first 26C and second 27C projections defined as an integral portion thereof. The transverse arm 55C has a flat top surface 61C and each of the T-shaped strips 24C is helically wound with its leg 53C disposed away from the center of the hose construction 20C with the flat top surface 61C of the transverse arm 55C comprising the inside surface 23C of said hose construction 20C and the arcuate bottom surface 60C comprising the outwardly convoluted configuration 21C of the hose construction 20C.

The U-shaped connector 52C has an arcuate bight 62C adjoined at its opposite ends by a pair of parallel members 57C. The arcuate bight 62C cooperates with the arcuate bottom surface 60C of each T-shaped strip 24C to define the outwardly convoluted configuration 21C of the hose construction 20C.

The hose construction 20D of FIG. 9 comprises a pair of identical polymeric strips 24D of T-shaped cross-sectional configuration and a special substantially U-shaped connector 52D connecting associated projections of the strips 24D. The strips 24D and connector 52D are wound in a helical pattern and interconnected by U-shaped adhesive means 37D between each leg 57D of connector 52D and an associated strip 24D to define the hose construction 20D having a pair of integral electrical conductors 22D extending therealong.

The T-shaped cross-sectional configuration of each of the strips 24D is defined by a leg 53D having a flat bottom surface 54D and a transverse arm 55D having first 26D and second 27D projections defined as an integral portion thereof. The transverse arm 55D and projections of each strip comprise the outwardly convex arcuate surface 21D of the hose construction 20D; and, each of the T-shaped strips 24D is helically wound with its leg 53D disposed toward the center of the hose construction 20D and with its transverse arm 55D comprising the outwardly convoluted configuration 21D of such hose construction and with the bottom surface 54D of the vertical leg 53D comprising the inside surface 23D of the hose construction 20D.

The special U-shaped connector 52D has its rectilinear bight 56D which is of extended length adjoined at its opposite terminal ends by the pair of parallel members 57D. The bight also has a pair of ribs 65D symmetrically disposed within the parallel members 57D such that each rib 65D and an associated member 57D receives an associated projection therewithin. The ribs 65D define an axial length 66D of the hose therebetween which provides improved flexibility for the hose construction 20D. The axial length 66D between each associated set of ribs 65D defines a tubular segment of the hose construction 20D and each tubular segment has a minimum wall thickness which assures the improved flexibility.

Each of the strips and U-shaped connectors disclosed herein is preferably made of a polymeric material in the form of a suitable thermoplastic material.

In addition, each of the electrical conductor means disclosed herein is preferably in the form of an electrical wire embedded within a central body with its central body serving as a matrix therefor. Each electrical wire may be a single wire of solid cross section or made of a plurality of twisted metal strands.

While present exemplary embodiments of this invention, and methods of practicing the same, have been illustrated and described, it will be recognized that this invention may be otherwise variously embodied and practiced within the scope of the following claims.

What is claimed is:

1. A fluid hose construction having an outwardly convoluted configuration, integral electrical conductor means, and a substantially smooth inside surface for minimum obstruction to fluid flow therethrough, said hose construction comprising; at least one elongated polymeric strip having a central body of solid cross section and having first and second projections extending from opposite side portions of said central body as a single-piece construction, said projections being disposed in parallel relation and parallel to said central body, each of said projections being defined by a pair of parallel planar surfaces interconnected at their terminal edges by a semicylindrical surface; said one strip being wound in a helical pattern with its projections connected to define said hose construction; said central body having outwardly convex arcuate surface means comprising a pair of semicylindrical surfaces having a common longitudinal edge forming said outwardly convoluted configuration, and a substantially flat surface which comprises said substantially smooth inside surface; said integral electrical conductor means extending through said central body.

2. A hose construction as set forth in claim 1 in which said projections extend in substantially diametrically opposed directions defined by one of said projections extending in the same direction as said outwardly convex arcuate surface means and the other of said projections extending in the same direction as said inside surface.

3. A hose construction as set forth in claim 1 and further comprising at least another elongated polymeric strip identical to said first-named strip, said strips having their first and second projections connected to define a strip assembly having the first projection of said one strip at one side thereof and the second projection of said other strip at the other side thereof, said assembly being wound in a helical pattern with the projections at opposite sides thereof connected to define said hose construction having a pair of said integral electrical conductor means extending therealong.

4. A hose construction as set forth in claim 1 in which said strip is made of a thermoplastic material.

5. A hose construction as set forth in claim 4 in which said electrical conductor means comprises at least one electrical wire embedded within said central body with said central body serving as a matrix therefor.

6. A hose construction as set forth in claim 5 in which said electrical wire is of solid cross section.

7. A hose construction as set forth in claim 5 in which said electrical wire is comprised of a plurality of twisted metal strands.

8. A hose construction as set forth in claim 4 in which said electrical conductor means comprises a plurality of electrical wires embedded within said central body which serves as a matrix therefor.

9. A hose construction as set forth in claim 1 and further comprising adhesive means bonding each of said projections in position.

10. A hose construction as set forth in claim 9 in which said adhesive means is in the form of a heat fused area.

11. A hose construction as set forth in claim 9 in which said adhesive means is in the form of an externally applied adhesive.

12. A fluid hose construction having an outwardly convoluted configuration, integral electrical conductors, and a substantially smooth inside surface for minimum obstruction to fluid flow therethrough, said hose construction comprising first and second identical elongated polymeric strips; each of said strips having a substantially T-shaped cross-sectional configuration being defined by a vertical leg having a flat bottom surface and a transverse arm having first and second projections defined as an integral portion thereof, said transverse arm and projections comprising an outwardly convex arcuate surface; a U-shaped connector connecting an adjacent projection of each strip, said strips and said connector being wound in a helical pattern and interconnected to define said hose construction; each of said strips having its leg disposed toward the center of said hose construction with the bottom flat surface of said leg comprising said inside surface, and the transverse arm comprising said outwardly convoluted configuration; one of said electrical conductors extending through each of said strips to define a pair of conductors extending throughout said hose.

13. A hose construction as set forth in claim 12 in which said U-shaped connector has a rectilinear bight adjoined at its opposite ends by a pair of parallel members disposed perpendicular thereto, said bight cooperating with said bottom surface to define said inside surface.

14. A hose construction as set forth in claim 13 in which said U-shaped connector has said rectilinear bight which is of extended length adjoined on its opposite terminal ends by said pair of parallel members, said bight also has a pair of ribs symmetrically disposed within said parallel members such that each rib and an associated member receives an associated projection therewithin, said ribs having an axial length therebetween which provides improved flexibility for said hose construction.

15. A hose construction as set forth in claim 14 in which the axial length between each associated set of ribs defines a tubular segment of said hose construction, each tubular segment having a minimum wall thickness which assures said improved flexibility.

* * * * *